Sept. 20, 1971  DE WITT H. WEST ET AL  3,605,685
APPARATUS FOR FLUIDIZING AND COATING A PARTICULATE MATERIAL
Original Filed Aug. 18, 1966  2 Sheets-Sheet 1

Fig. 1.

INVENTORS
DEWITT HENRY WEST
ALEXANDER BOWEN SIMPSON
ROSS LOWNDES SIMMS
BY M. L. Pinel
ATTORNEY

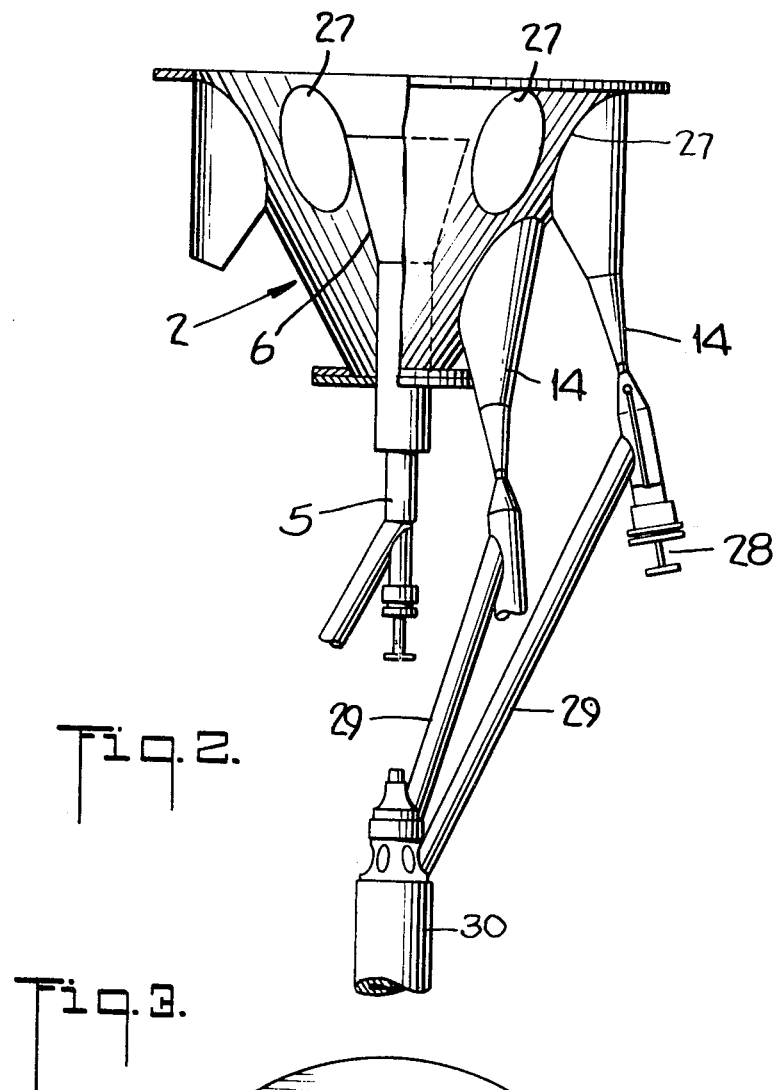
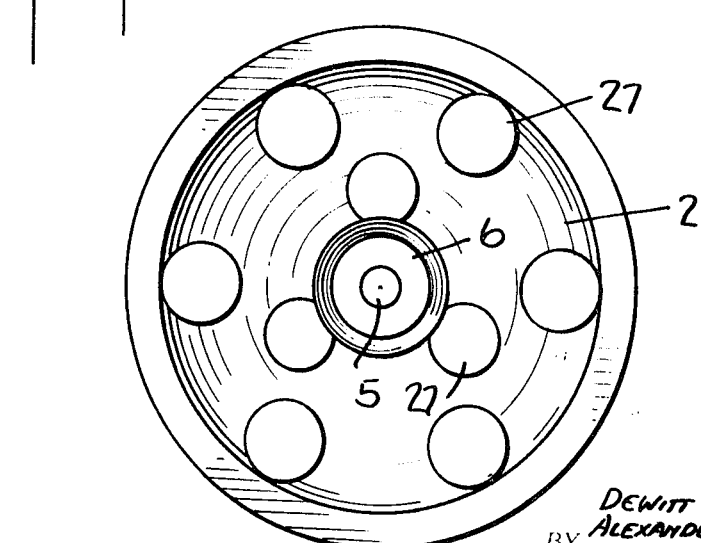

United States Patent Office  3,605,685
Patented Sept. 20, 1971

3,605,685
APPARATUS FOR FLUIDIZING AND COATING A PARTICULATE MATERIAL
DeWitt Henry West, Alexander Bowen Simpson, and Ross Lowndes Simms, Swansea, Wales, assignors to The International Nickel Company, Inc., New York, N.Y.
Original application Aug. 18, 1966, Ser. No. 573,358. Divided and this application Nov. 5, 1969, Ser. No. 871,086
Claims priority, application Great Britain, Aug. 25, 1965, 36,534/65
Int. Cl. C23c *11/02*
U.S. Cl. 118—48                                     6 Claims

ABSTRACT OF THE DISCLOSURE

Particulate materials are coated with a metal by decomposing metal carbonyls in a fluidized bed of the particulate materials. A fluid bed reactor with at least one venturi inlet for introducing a fluidizing suspension and a metal carbonyl inlet placed away from the walls of the reactor is employed.

---

The present application is a division of our copending U.S. application Ser. No. 573,358 filed Aug. 18, 1966 and now abandoned.

The present invention relates to coating particulate material with metal, and more particularly to coating solid particulate material with metal by thermal decomposition of a metal carbonyl in a fluidized bed and apparatus therefor.

There have been several proposals to coat solid particles in fluid bed reactors by thermal decomposition of metal carbonyls upon the solid particles comprising the fluid bed. However, in none of these proposals have the problems of securing substantially complete decomposition within the bed and obtaining a uniform product while avoiding the deposition of metal on the walls of the decomposer, on the surfaces of heating elements in the bed on on the carbonyl inlet been satisfactorily solved. Although fluid bed reactors are widely known as being highly efficient in heat transfer processes, it is also well known that heat transfer from the wall of the reactor to the fluidized bed or heat transfer from a submerged heating element to the fluidized bed is somewhat inhibited by the presence of a thin film adjacent to the heat transfer surface which creates a resistance to heat flow from the heated surface to the fluidized bed. As a consequence of the film the heat exchange surface must be maintained at a higher temperature than the temperature of the fluidized mass. Thus, when employing such heating means to decompose highly heat sensitive compounds such as metal carbonyls, any metal carbonyls contacting such heat exchange surfaces which are, out of necessity, maintained at a higher temperature than the fluidized mass will be thermally decomposed and deposited thereon. If such deposits are adherent, the plant has to be shut down to remove them, while if the metal flakes off it contaminates the bed. Closely allied to the problem of deposits on the walls of externally heated decomposers is the tendency of the particulate material to cake on the heated walls. This greatly reduces the rate of heat transfer through the walls, and again the only remedy is to shut down the plant to remove the deposit.

Another problem associated with the decomposition of metal carbonyls is contamination of the product with carbon. At temperatures exceeding 300° C., e.g., 330° C. or higher, carbon monoxide starts to disproportionate into carbon dioxide and carbon with the released carbon contaminating the product. The problem of carbon contamination is further aggravated when the inert gas, which is commonly employed to dilute the metal carbonyl, is carbon monoxide. Carbon monoxide is preferably employed as a diluent to avoid costly processing to separate carbon monoxide which is a product of decomposition and the diluent gas, but use of carbon monoxide as a diluent requires higher decomposition temperatures and can increase carbon contamination of the product. Thus, suggestions to preheat fluidizing gases when decomposing metal carbonyls in fluid bed reactors have been effectively limited to fluidizing gases such as hydrogen since a carbon monoxide fluidizing gas cannot be preheated to sufficiently high temperatures to supply the required heat for decomposition without encountering substantial carbon monoxide disproportionation. These suggestions, although operable, also require costly gas separation provisions which limit their implementation in industry. Although attempts were made to overcome the foregoing difficulties and other difficulties, none, as far as we are aware, was entirely successful when carried into practice commercially on an industrial scale.

It has now been discovered that particulate material can be coated with a metal in a fluidized bed by thermally decomposing metal carbonyl therein while avoiding the serious drawback of depositing undue amounts of the metal on the reactor walls.

It is an object of the present invention to provide an apparatus for coating particulate material with a metal by thermally decomposing metal carbonyls in a fluidized bed of the particulate material.

Another object of the invention is to provide an apparatus for thermally decomposing metal carbonyls in a fluidized bed of particulate material to coat the particulate material while avoiding depositing substantial portions of the metal on the reactor walls.

A further object of the invention is to provide an apparatus for decomposing metal carbonyls in a fluidized bed.

Other objects and advantages will become apparent from the following description taken in conjunction with the accompanying drawings in which:

FIG. 1 is a diagrammatic drawing of apparatus which can be employed to practice the process of the present invention;

FIG. 2 is an elevational view partly in section of an advantageous embodiment of the reactor base; and FIG. 3 is a plan view of FIG. 2.

Generally speaking, the present invention contemplates an apparatus for coating particulate material with metal by thermally decomposing metal carbonyls in a fluidized bed of heated particulate material. A fluidized bed of the particulate material is established in a fluid bed reactor and a heat decomposable metal carbonyl is introduced into the interior of the fluidized bed. The fluidized state of the bed is maintained by introducing a fluidizing gas having suspended therein particulate material so that the heat capacity of the fluidizing gas with the particulate material suspended therein is at least about 0.43 kilocalorie per standard cubic meter per degree centigrade (kcal./M³/° C.). The temperature of the fluidized bed is maintained at a temperature sufficiently high to thermally decompose the metal carbonyl solely by preheating the fluidizing gas with the particulate material suspended therein. Since particulate material is constantly introduced to the fluidized bed by the fluidizing gas, the coated particulate material is withdrawn from the fluidized bed at a rate proportional to the rate at which the particulate material is introduced to the fluidized bed in order to maintain the bed at a substantially constant level.

The invention comprises a fluid bed reactor having a downwardly converging base with at least one venturi inlet for a suspension of particulate material in fluidizing gas, a solids outlet in the chamber wall, a gas outlet in the upper part of the chamber, and having at least one upwardly and outwardly flaring nozzle for metal carbonyl vapour on or near the axis of the chamber and spaced between the venturi inlet and the solids outlet, advantageously near, e.g., below a plane passing through the intersection of the walls of the reactor and the base; a stand-pipe connecting the solids outlet to a gas-powder mixer; a gas compressor connected between the gas outlet of the chamber and the mixer; and a heat-exchanger for heating the solid-gas mixture connected between the mixer and the venturi inlet.

The shape of the decomposer is of importance for obtaining the best results. It is not feasible to introduce the suspension of powder through the usual type of perforated bottom plate, because of the abrasive action of the suspension of particles flowing at high velocity and the possibility of blockage when the size of the particles increases as a result of the deposition of metal upon them. This difficulty can be overcome by the use of a cylindrical decomposer with an essentially conical base, the suspension being introduced through one or more inlets in the base. In a small decomposer only one inlet may be required, and it is put at the apex of the conical part, but in a larger decomposer more than one inlet in the wall of the conical base is required to ensure proper distribution of the suspension in the bed. For example, in a decomposer 12 inches in diameter there may be as many as nine inlets. These inlets may be arranged, for example, with three inlets lying on a circle of small radius close to the apex and the remainder on a circle of larger radius at a higher level. The concial shape of the base is an important feature fo the decomposer as it permits a fluidizing mixture of high mass ratio to be used, allows the decomposer to be completely emptied and gives very vigorous fluidization near the carbonyl inlet and so prevents caking or sticking.

It is found that there is undesirable wear if the or each inlet for the suspension of powder is formed simply by a pipe of uniform bore terminating in the apex of the cone or in the wall of the conical base, but that the wear is much reduced if the inlet is of venturi shape.

The use of multiple venturi inlets greatly reduces surging and bumping of the bed. Also a large decomposer with only a single inlet would need to have a very long base cone. With multiple inlets a much shorter cone can be used, with the advantages of decreased pressure across bed, and thus lower compression costs and greater economy of operation, and also a reduction of the amount of powder in the decomposer.

The decomposing vessel must, of course, have a solids outlet at the level of the top of the fluidized bed that is formed in use, and a gas outlet at the top. It must also contain the inlet or inlets for the carbonyl vapour, which should be of upwardly flaring conical shape as explained above, be fluid-cooled and lie on or near the axis of the chamber at a level close to that of the junction between the cylindrical and conical parts of the vessel. This form of carbonyl inlet is important, as it causes the minimum interference with fluidization and also decreases the velocity of the carbonyl gas as it enters the bed and hence minimises bubbling.

A complete plant for carrying out the process also includes a stand-pipe connecting the solids outlet to a gas-powder mixer; a gas compressor connected between the gas outlet of the chamber and the mixer; and a heat-exchanger for heating the solid-gas mixture connected between the mixer and the venturi inlet or inlets. Advantageously the plant also include a gas preheater between the gas compressor and the mixer. This serves also to decompose any undecomposed carbonyl and strips it out of the recirculated gas.

According to the invention solid particles are introduced into the bottom of the fluid bed in a vertical decomposer as a preheated suspension in an inert fluidizing gas and the gaseous metal compound is introduced upwardly into the bed through one or more cooled inlets above the bottom of the bed and spaced away from the decomposer walls, the temperature and heat content of the suspension being at least high enough to decompose the metal compound.

It is most important that all the heat required for the decomposition is supplied by the preheated gas-solids suspension which also maintains the bed in a fluidized state. The use of heated walls and internal heaters, with the attendant problems of wall plating and caking of the powder, is thus avoided. Thus, the process of the present invention takes advantage of an effect which is a serious drawback of prior art processes wherein heat is supplied through the reactor wall. The reactor walls will of course become heated by the suspension, and the decomposable metal carbonyl must therefore be introduced far enough from the walls to ensure that it is wholly decomposed within the fluid bed.

The use of preheated gaseous suspension of powder particles both as the fluidizing meduim and as the sole means of introducing heat of reaction has several advantages. The density of the suspension is higher than that of the gas alone, which greatly increases the stability of fluidization of the bed. Such a suspension also has a higher heat capacity per unit volume than the gas alone so that a large amount of heat can be supplied to the bed at a very high rate. Accordingly, requisite process heat can be supplied by a gas-solids suspension having a temperature markedly lower than the preheat temperature which would be required to supply the same amount of heat by means of preheated gas containing no solids. This feature of the invention provides the distinct advantage of minimizing disproportionation of carbon monoxide which would result from preheating the fluidizing carbon monoxide gas to too high a temperature. Also, problems associated with dusting can be minimized since, if more heat is required, the additional heat can be supplied by increasing the amount of particulate material in the fluidizing gas without raising the temperature of the fluidizing gas or the flow rate thereof.

The heat-transfer properties of the suspension are good, so that on the one hand it can readily be preheated to the desired temperature, and on the other hand the heat content thereof is rapidly transferred to the fluid bed. Together with the spacing of the inlets for the metal carbonyl away from the walls, this ensures that as the metal carbonyl enters the decomposer it is surrounded by the hot fluid bed and is quickly decomposed before it can reach the walls of the decomposer. Wall plating is thus avoided. Decomposition on the inlets themselves is avoided by cooling them.

The velocity at which the gaseous metal carbonyl enters the bed should be low enough to ensure that it does not cause excessive bubbling in the fluid bed and hence pass up through the bed without being decomposed. Advantageously, the entry velocity is reduced by the use of inlets in the shape of upwardly flaring cones, with an included angle, for example, of about 30°. In a decomposer of small diameter, e.g. about 4 inches, a single inlet will suffice, and this should be placed on the decomposer axis. When more than one inlet is required, as in a large-diameter decomposer, they should be arranged close to the axis to ensure that the carbonyl is distributed symmetrically.

To keep the volume of the fluid bed constant, coated particles must be removed from the bed at the same rate as particles are introduced in the preheated suspension. For many purposes a single pass through the bed will not suffice to produce an adequate coating, and according to a further feature of the invention some or all of the particles removed from the bed are recirculated through the decomposer after being resuspended in fluidizing gas and reheated. Advantageously, fluidizing gas is also recirculated through the decomposer, some or all of it being used to resuspend the solid particles, if necessary after preheating to remove undecomposed metal carbonyl.

It will be appreciated that when gaseous decomposition products are formed, as in the case of metal carbonyls, these must be removed from the system. Thus, when carbon monoxide is used as the fluidizing gas and further carbon monoxide is formed by the decomposition, an amount equal to that formed must be purged from the system. When gases other than the fluidizing gas are formed, they must be removed from the system by suitable means, for example, by chemical treatment.

The nature of the particles to be coated is not important. By means of the invention both metals and non-metals may be coated with metals, and by coating a metal with itself small particles may be built up to larger ones. As the decomposable metal carbonyls nickel and iron carbonyls are particularly suitable.

The invention will now be described in more detail with reference to the accompanying diagrammatic drawing of apparatus according to the invention, using nickel carbonyl as an example of a decomposable metal carbonyl and carbon monoxide as the fluidizing gas.

The decomposer 1 has a cylindrical body and a conical base 2 terminating in a venturi opening 14 through which a preheated suspension of powder in carbon monoxide gas is introduced to form a fluidized bed 3. A mixture of nickel carbonyl vapour and carbon monoxide, compresed in a compressor 4, enters the decomposer through a valve 5 and a water-cooled conical inlet 6 on the axis of the decomposer and opening upwardly into the bed, and is decomposed in the bed to form a coating of nickel on the surface of the powder particles. The venturi cone shape of the base is an important feature of the decomposer as it permits a fluidizing mixture of high mass ratio to be used, allows the decomposer to be completely emptied and gives very vigorous fluidization near the carbonyl inlet and so prevents caking or sticking. As shown in FIGS. 2 and 3, two or more, e.g., nine, venturi inlets can advantageously be provided at the base of the reactor in order to insure good quality fluidization especially in the larger commercial units where bumping, i.e., slugging, and gas bypassing can occur if a single venturi inlet is used. The inverted conical form of carbonyl inlet situated on the axis of the decomposer is also important, as it causes the minimum interference with fluidization and also decreases the velocity of the carbonyl gas at it enters the bed and hence minimizes bubbling. Powder from the top of the bed is bled off down a standpipe 7 through a feed control valve 8 into an ejector 9 fed with carbon monoxide gas under pressure from a compressor 10. The head of powder in the standpipe 7 prevents the compressed gas from blowing back directly into the decomposer.

An agitator (not shown) consisting, for example, of a rotatable wire carrying blades, may be fitted inside the standpipe 7 to assist the downward flow of the powder. The gas carries the powder as a suspension from the ejector 9 upwards through the inner tube 11 of a tubular preheater 21 may be fitted between the compressor 10 and its jacket and thence through a valve 13 and the venturi tube 14 into the decomposer.

The gas leaving the top of the fluidized bed 3, which includes additional carbon monoxide introduced with the nickel carbonyl and formed by the decomposition reaction, passes to a cyclone 15 where it is separated from entrained powder particles, which are returned to the decomposer through a flap valve 16. The gas, after cooling in a water-jacketed cooler 17, is cleaned in a filter 18 from any remaining dust, which is returned to the decomposer through a rotary valve 19.

Excess gas is then bled off through a valve 20, and the remaining gas passes to the compressor 10. A tubular heater 21 may be fitted between the compresor 10 and the ejector 9 to decompose and strip out any residual carbonyl (especially on starting up the plant) and to serve as a first-stage preheater.

When starting up the plant, powder may be initially charged into the decomposer from a hopper 22 through a valve 23. Coated powder product may be discharged through a take-off leg 24 and a valve 25, and the decomposer may be emptied completely by opening valves 13 and 26.

The output of the plant depends upon the rate at which heat can be introduced to decompose the carbonyl or other decomposable compound and this in turn depends upon the mass ratio of the heated powder-gas mixture. The mass ratio that can be used is determined by several factors, including the specific heat and density of the powder used to form the bed material and the geometry of the plant. Thus, for a given rate of heat supply, a lower mass ratio can be used with a powder of higher specific heat. Higher mass ratios necessitate the use of higher gas velocities in the preheater to prevent sticking, but a limit is set to the gas velocities by the resultant back pressure, which must not be so great that the compressed gas is blown back up the stand-pipe into the decomposer. Higher mass ratios could thus be achieved by increasing the height of the stand-pipe or increasing the density of the powder. Efficient use of the plant and smooth fluidization is obtained by employing a mass ratio such that the heat capacity of the gas-solids fluidizing and heat exchange medium is at least about 0.43 kcal./$M^3$/° C., and advantageously at least about 0.57 kcal./$M^3$/° C. Usually the heat content of said gas-solids mixture will not exceed about 3.0 kcal./$M^3$/° C.

The apparatus of the invention is particularly suitable for the coating of fairly coarse powders, e.g., those having particle sizes in the range from about 350 mesh British Standard Screen (B.S.S.) to about $\frac{1}{32}$ inch. It can be used, for example, for producing coarser nickel powder by coating finer nickel particles, initially of size in the lower part of this range, by the decomposition of nickel carbonyl; for coating magnesium powder with nickel using nickel carbonyl; for coating nickel or other powders with iron by the use of iron carbonyl; and for coating sand, alumina, magnesia, silicides, carbides, nitrides, carbon or other refractory particles with nickel, e.g., for catalytic uses, using nickel carbonyl. Another use of the invention is for the production of hollow metal powders by coating particles of a soluble material, e.g., a salt such as sodium chloride, using carbonyl, e.g., nickel or iron carbonyl, followed by leaching out of the salt with water.

When using nickel or iron carbonyl as the decomposable compound, it is usually convenient to use carbon monoxide as the fluidizing gas, since chemical purification of the fluidizing gas is then unnecessary. However, it is also possible to coat particles of materials of fairly low melting point, e.g., thermosetting resins, by means of nickel or iron carbonyl if hydrogen or nitrogen is used as the fluidizing gas. The partial pressure of carbon monoxide in the system is thus lowered, and the effect of this in favouring the decomposition of carbonyl enables the operating temperature of the decomposer to be decreased, e.g., the fluidized bed can be operated at temperatures as low as 50° C. and the fluidizing gas such as hydrogen or nitrogen with particulate material suspended therein can be preheated to a temperature as low as 60° C. To maintain its low partial pressure, carbon monoxide must be continuously removed from the circulating gas, e.g., by absorption in ammoniacal cuprous formate (copper liquor). This treatment can be carried out in various ways, e.g., by passing the whole of the circulating gas through an absorber or by treating part of the gas stream and returning the treated gases to the system. When the fluidizing gas is hydrogen or nitrogen and a low carbon monoxide partial pressure is maintained, the fluidizing gas with particulate material suspended therein can be preheated to a temperature of about 500° C. and the fluidized bed can be operated at a temperature above 300° C. without encountering substantial carbon contamination of the product from carbon monoxide disproportionation.

In carrying the invention into practice, it is preferred to establish a fluidized bed of heated solid particulate material. Gaseous metal carbonyls such as nickel carbonyl or iron carbonyl are introduced into the fluidized bed at a point sufficiently removed from the walls of the fluid bed reactor so that the metal carbonyl is substantially decomposed and is plated on the heated solid particulate material before the gaseous metal carbonyl reaches the reactor walls. The fluidized state of the bed is maintained by passing therethrough a fluidizing gas of carbon monoxide having suspended therein the solid particulate material to be coated. Sufficient solid particulate material is suspended in the fluidizing gas so that the heat capacity of the fluidizing gas with the particulate material suspended therein is at least about 0.43 kcal./M³/° C. The temperature of the fluid bed is controlled from about 180° C. to about 300° C. by preheating the fluidizing gas with the solid particulate material suspended therein to a temperature from about 200° C. to about 330° C. so that sufficient heat is introduced to the fluid bed to decompose the metal carbonyl and to coat the solid particulate material. The coated particulate material is withdrawn from the fluid bed reactor at a rate proportional to the rate of introduction of the solid particulate material suspended in the fluidizing gas.

The process is advantageously conducted in an apparatus such as shown in FIG. 1, which is equipped with a plurality of venturi inlets to admit the fluidizing gas with particulate material suspended therein as shown in FIGS. 2 and 3. The reactor base 2 is provided with a plurality of ports 27 which are symmetrically disposed about the reactor base 2 as shown in FIG. 3. Venturi inlets 14 equipped with plug type valves 28 are operably fitted to ports 27. Fluidizing gas with particulate material suspended therein is introduced from the preheater 12 as shown in FIG. 1 to the distributor 30 through conduits 29 and then through the venturi inlets 14 to fluidize particulate material contained in the fluid bed reactor. Metal carbonyl is introduced to the reactor from a source as shown in FIG. 1 through valve 5 and into the fluidized bed through the upwardly and outwardly flaring nozzle 6. A reactor base equipped with a plurality of venturi inlets as shown in FIG. 2 provides smoother fluidization and improves gas-solid contact. An arrangement as shown in FIG. 2 also has the advantage of lowering the height of the conical base which permits lower operating pressures. Lower operating pressures are obviously an operating advantage when large commercial units are employed.

An example of the use of the invention to coat aluminum powder with nickel will now be given, using the plant described and illustrated in FIG. 1. The decomposer was four inches in internal diameter.

A charge of 3.38 kilograms of aluminum powder with a bulk density of 1.07 grams per milliliter and of such size that it passed through a 60 mesh B.S. sieve but was retained on a 350 mesh sieve was fed into the decomposer from the hopper 22 with the valves 13, 26 and 5 all closed. The compressor 10 was started to compress the air in the circuit, and when the pressure in the pipe leading to the base of the decomposer was 15 p.s.i.g., the valve 13 was opened. Fluidization commenced and the back pressure decreased to about 1 lb./sq. in. The valve at the base of the standpipe 7 was then partially opened and powder circulation started. Circulation of the powder at this point was controlled to give a mass ratio of aluminum powder to air of about 3:1. The amount of powder circulating down the standpipe and into the ejector 9 was controlled by the valve 8 so that the total back pressure at the ejector outlet was about 3 lbs./sq. in. The air in the plant was then displaced by inert gas, and the preheater 12 and the carbonyl stripper 21 were heated up to give exit powder-gas suspension and exit gas temperature of 300° C. and 230° C., respectively.

The inert gas in the plant was now displaced by carbon monoxide and this gas was then recirculated around the plant circuit. The preheated carbon monoxide with the aluminum powder suspended therein had a mass ratio of powder to gas of about 3:1 and the heat capacity of the suspension was about 1.06 kcal./M³/° C. A mixture of nickel carbonyl vapour and carbon monoxide, containing 8% by volume of nickel carbonyl, was then admitted to the decomposer through the inlet 6 by opening the valve 5. At the same time the vent cock 20 in the compressor inlet line was opened to release an amount of carbon monoxide equal to that introduced with the nickel carbonyl and being formed by decomposition of the nickel carbonyl in the decomposer. The temperature in the fluidized bed then remained steady at 210° C.

The plant was operated under these conditions for 5 hours, until a total of 1.28 kilograms of nickel had been deposited on the aluminum. It was then shut down and the product was discharged. It consisted of a free-flowing powder of bulk density 1.64 g./ml. in which the aluminum particles had a uniform coating of nickel, their nickel content being 27.5% and their carbon content 0.028%.

It is to be noted that the present invention is not to be confused with other coating apparatus which rely on recirculating preheated particulate material through the free space of a decomposer. Such prior art apparatus do not employ a dense fluid bed in accordance with the present invention. The dense heated fluid bed employed in accordance with the present invention exposes a surface area of the particulate material to be coated which is many fold greater than free space decomposers. In operating free space decomposers to achieve the same production rate as in a fluid bed decomposer, either the size of the free space must be made undesirably high to compensate for the lack of exposed surface area of the particulate material or higher temperatures must be employed. Lower temperatures are advantageous when coating a particulate material different from the metal being deposited since at the lower temperatures there is less chance of nucleating the metal from the gaseous compound thereby avoiding contamination of the coated particles with particles of the metal. Also, lower temperatures avoid carbon contamination of the product when carbon monoxide is employed as a carrier or fluidizing gas.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. An apparatus for decomposing metal carbonyls and coating a fluidized particulate material therewith which comprises a fluid bed reactor having a downwardly converging base, a plurality of verturi inlets in said base for admitting thereinto steams of a fluidizing gas with said particulate material suspended therein, a metal carbonyl inlet means comprising a flared, water cooled nozzle disposed within said base and spaced away from the walls thereof, a heat exchanger for heating a supply of said fluidizing gas with particulate material suspended therein, means for conducting heated fluidizing gas with particulate material suspended therein from said heat exchanger to said venturi inlets to fluidize particulate material in said fluid bed reactor and circulating means for conducting at least a portion of the fluidizing gas and particulate material in said fluid bed reactor to said supply at the heat exchanger.

2. An apparatus as described in claim 1 wherein said nozzle flares out at about 30°.

3. An apparatus as described in claim 2 wherein said nozzle is water cooled.

4. An apparatus as described in claim 1 wherein the metal carbonyl inlet means are vertically located within said base near the horizontal plane passing through the intersection of said base and the walls of said reactor.

5. An apparatus as described in claim 1 wherein the metal carbonyl inlet means are vertically located near a plane passing through the intersection of said base and the walls of said reactor.

6. An apparatus according to claim 1 in which a plug valve is provided in each inlet for the suspension closing the throat of the venturi.

References Cited

UNITED STATES PATENTS

| | | | |
|---|---|---|---|
| 2,638,414 | 5/1953 | Lewis | 75—26 |
| 2,729,597 | 1/1956 | Garlo | 117—F.B. |
| 2,986,475 | 5/1961 | Mesnard et al. | 118—303X |
| 2,768,095 | 10/1956 | Tadema et al. | 117—100(A) |
| 3,053,648 | 9/1962 | Stephens, Jr. et al. | 75—26 |
| 3,089,824 | 5/1963 | Wurster | 117—F.B. |
| 3,110,626 | 11/1963 | Larson et al. | 118—303 |
| 3,112,220 | 11/1963 | Heiser, Jr. et al. | 117—100 |
| 3,231,413 | 1/1966 | Berguin | 117—100 |
| 3,252,823 | 5/1966 | Jacobson et al. | 117—100 |
| 3,443,621 | 5/1969 | Dubreuil | 118—303X |

MORRIS KAPLAN, Primary Examiner

U.S. Cl. X.R.

34—57; 118—303, 603